Sept. 25, 1934.  D. STOUBER  1,974,669
SAFETY WHEEL FOR VEHICLES
Filed Sept. 30, 1933
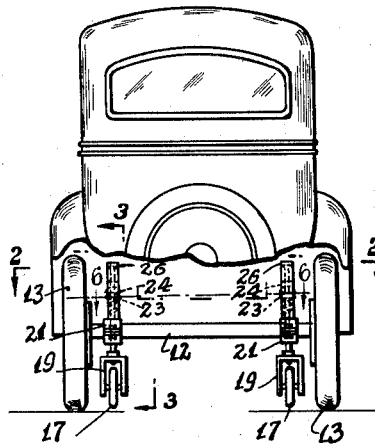
Fig. 1.
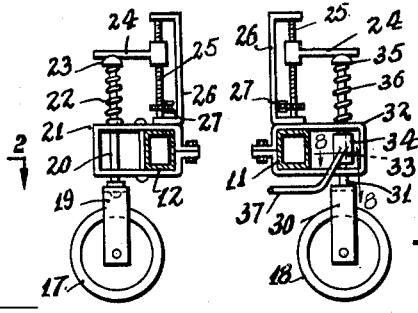
Fig. 3.  Fig. 4.
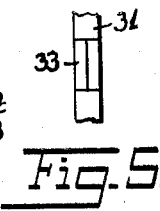
Fig. 5.
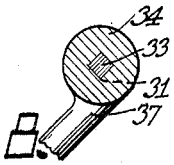
Fig. 8.
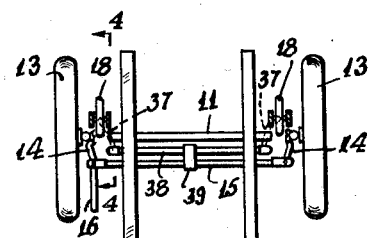
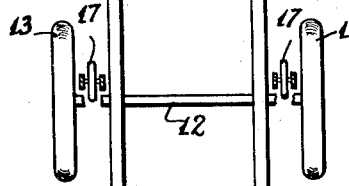
Fig. 2.
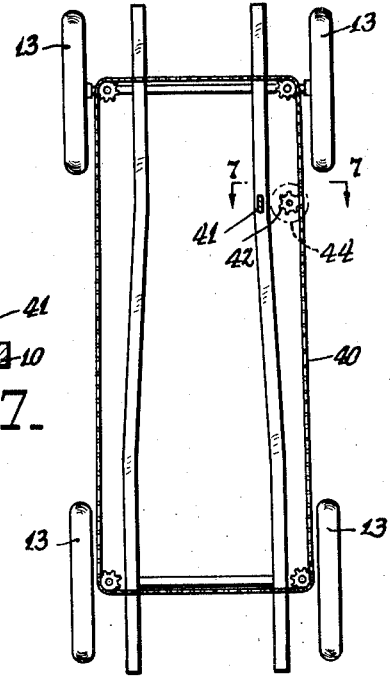
Fig. 7.
Fig. 6.
INVENTOR
DAVID STOUBER
BY
ATTORNEY Patented Sept. 25, 1934

1,974,669

UNITED STATES PATENT OFFICE 1,974,669

SAFETY WHEEL FOR VEHICLES

David Stouber, New York, N. Y.

Application September 30, 1933, Serial No. 691,576

3 Claims. (Cl. 280—150)

This invention relates to new and useful improvements in safety wheels for vehicles.

The invention has for an object the provision of several safety wheels associated with the regular wheels of a vehicle and arranged so that when the tires of the vehicle become deflated the vehicle may still travel along upon the safety wheels.

Still further the invention proposes so arranging the safety wheels that they naturally take up the load of the car when the regular wheels become inoperative, for example, when the tires become deflated.

Still further the invention proposes arranging front safety wheels in a manner so as to steer automatically according to conventional steering of the vehicle so that the vehicle may be under perfect control with the safety wheels in operation.

Still further the invention contemplates an arrangement whereby the safety wheels may be lowered to a position so as to take all of the load of the vehicle, allowing the vehicle to be moved upon these wheels.

Still further the invention proposes an arrangement whereby when all the safety wheels are lowered as called for in the previous paragraph the vehicle may be moved in all directions upon these wheels, that is, frontwards, backwards, sidewards or in other direction.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a rear elevational view of a vehicle equipped with safety wheels according to this invention, a portion of the body of the vehicle being broken away to disclose interior parts.

Fig. 2 is a horizontal sectional view as though taken on the line 2—2 of Fig. 1, showing in particular a detail of the chassis of the vehicle.

Fig. 3 is a fragmentary enlarged sectional view taken on the line 3—3 of Fig. 1.

Fig. 4 is a fragmentary enlarged sectional view taken on the line 4—4 of Fig. 2.

Fig. 5 is a fragmentary detailed view of a portion of Fig. 4.

Fig. 6 is a horizontal sectional view taken on the line 6—6 of Fig. 1.

Fig. 7 is a fragmentary vertical sectional view taken on the line 7—7 of Fig. 6.

Fig. 8 is a horizontal enlarged sectional view taken on the line 8—8 of Fig. 4.

The safety wheels according to this invention are used in combination with a vehicle having a chassis 10 associated with a front axle 11 and a rear axle 12, with inflated tire wheels 13 upon these axles. The wheels 13 upon the front of the chassis are mounted for steering in a conventional manner by arms 14 connected together by a link 15 and controlled by linkage 16.

The safety wheels according to this invention are associated in the vicinity of each of the deflatable wheels 13. More particularly there is one safety wheel for each of the wheels 13. The rear safety wheels are indicated by the numerals 17 and the front safety wheels by numerals 18.

Each of the rear safety wheels 17 is mounted upon a fork 19 which is swiveled upon the lower end of a stem 20 mounted through a clamp 21 engaged upon the axle 12. An expansion spring 22 acts between the clamp 21 and a head 23 upon the top of the stem so as to normally urge the stem upwards. A means is provided for moving the stem 20 downwards to engage the safety wheels 17 against the ground when desired.

The means mentioned in the end of the last paragraph comprises a follower 24 engaging the head 23 of the stem and threadedly engaged upon a screw 25 rotative in a frame 26 mounted upon the clamp 20. A sprocket 27 is fixed upon the screw 25.

Each of the front safety wheels 18 is mounted upon a forked shaped member 30 which is fixed on the lower end of the stem 31. Thus the forks 30 of the front wheels 18 can move only as the stem 31 moves. Each stem 31 engages through a clamp 32 fixed upon the front axle 11. Each of the stems 31 is provided with a square portion 33 engaged by a bushing 34 arranged between certain parts of the clamp 32. The upper end of the stems 31 are provided with the heads 35 and expansion springs 36 acting between the clamps 32 for normally urging the stems upwards. In this raised position the bushings 34 engage the square portions 33 so that the stems may be turned as the bushings turn. An arm 37 projects from each of the bushings and a link 38 connects the arms for unitary motion.

Another link 39 connects the link 38 with the link 15 of the mechanism for steering the front wheels. A means is provided for lowering the front safety wheels. This means is identical to the means previously described relative to the rear wheels and the corresponding parts may be recognized by the same reference numerals.

A chain 40 connects each of the sprockets 27 together so as to move simultaneously. This chain passes between a stationary block 41 mounted upon the chassis 10 and a driver gear 42 fixed upon a spindle 43 rotatively mounted and equipped with a hand wheel 44 at a point in the vehicle convenient for the operator to turn. The operator may turn the wheel 44 for causing all of the sprockets 27 to turn simultaneously.

Normally all of the safety wheels are in their raised positions. Should any of the tires of the vehicle "blow out" then the particular wheel deflates to a point where the safety wheel touches the ground and takes its load. Thus the vehicle may proceed until it is convenient to repair the blown out tire. Since the front wheels 18 are connected up with the steering mechanism of the vehicle, there is perfect control of the vehicle.

If it is desired to lower the safety wheels so as to take the load from the regular wheels to allow the car to be pushed along thereon it is merely necessary that the wheel 44 be rotated to move the chain 40 and sprocket 27. This will cause the screws 25 to rotate to lower the followers 24 and depress the stems which lowers the safety wheels. Particular attention is called to the fact that as the front safety wheels are lowered the square portion 33 from the stems 31 disengage from the bushings 34 so that the stems 31 are free to rotate. With this arrangement it is possible to turn each of the safety wheels transversely so that the car may be pushed sideways. This will be of advantage to place the car in a space too small to allow natural parking therein.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim is new and desire to secure by United States Letters Patent is:—

1. In combination with the chassis of a vehicle having axles and deflatable tires, a safety wheel structure in the vicinity of each deflatable tire, comprising a clamp engaged upon the axle, a stem through said clamp, a wheel mounted upon the lower end of said stem, resilient means connecting between said stem and clamp for urging the stem into a raised position, means for moving said stem downwards for lowering the wheel to the ground said stem being provided with a square portion slidably non-rotatively engaging a bushing, and steering mechanism connected with said bushings.

2. In combination with the chassis of a vehicle having axles and deflatable tires, a safety wheel structure in the vicinity of each deflatable tire, comprising a clamp engaged upon the axle, a stem through said clamp, a wheel mounted upon the lower end of said stem, resilient means connecting between said stem and clamp for urging the stem into a raised position, means for moving said stem downwards for lowering the wheel to the ground, said stem being provided with a portion slidably non-rotatively engaging a bushing and steering mechanism connected with said bushings.

3. In combination with the chassis of a vehicle having axles and deflatable tires, a safety wheel structure in the vicinity of each deflatable tire, comprising a clamp engaged upon the axle, a stem through said clamp, a wheel mounted upon the lower end of said stem, resilient means connecting between said stem and clamp for urging the stem into a raised position, means for moving said stem downwards for lowering the wheel to the ground, said stem being provided with a portion slidably non-rotatively engaging a bushing and steering mechanism connected with said bushings, said bushing being held by said clamp against longitudinal motion while permitted to turn.

DAVID STOUBER.